Sept. 2, 1952     J. H. GERTH     2,609,435

TEST SET FOR MEASURING THE ANGLE REPRESENTED BY SYNCHRO VOLTAGES

Filed Aug. 2, 1951     3 Sheets-Sheet 1

$$\frac{E_x}{E_A} = \frac{1}{2}\left[1 + \sqrt{3}\,\mathrm{TAN}(\theta - 30°)\right]$$

INVENTOR
J. H. GERTH
BY
W. R. Dawson
ATTORNEY

FIG.3

Sept. 2, 1952  J. H. GERTH  2,609,435
TEST SET FOR MEASURING THE ANGLE REPRESENTED BY SYNCHRO VOLTAGES
Filed Aug. 2, 1951  3 Sheets-Sheet 3

INVENTOR
J. H. GERTH
BY
*W. R. Dawson*
ATTORNEY

Patented Sept. 2, 1952

2,609,435

UNITED STATES PATENT OFFICE 2,609,435

TEST SET FOR MEASURING THE ANGLE REPRESENTED BY SYNCHRO VOLTAGES

John H. Gerth, Winston-Salem, N. C., assignor to Bell Telephone Laboratories, Incorporated, New York, N. Y., a corporation of New York Application August 2, 1951, Serial No. 240,015

4 Claims. (Cl. 177—337)

This invention relates to a device for testing synchronous control transformers.

The object of the invention is a portable test set to measure the angle of rotation of the rotor of a synchronous control transformer as represented by the voltages at the terminals of the three windings of the transformer.

A feature of the invention is a bridge circuit connected to the terminals of the three windings of the transformer, including a potentiometer arrangement for indicating a ratio of the voltages at the terminals of the three windings of the transformer. The potentiometer arrangement may include a plurality of potentiometer resistors connected in serial relationship and a plurality of equal shunt resistors respectively connectable in parallel relationship with said potentiometer resistors, said potentiometer resistors being so proportioned that, with said shunt resistors, the potentiometer ratio of the junction of each two potentiometer resistors corresponds to a different known angle of rotation of the rotor.

Another feature of the invention is a linear potentiometer with a winding having the same resistance as the equal shunt resistors, and switching means for substituting the linear potentiometer winding for one of the shunt resistors.

A further feature of the invention is a resistor, having the same resistance as the combined resistance of the potentiometer and shunt resistors, connected in serial relationship therewith, and switching means for connecting this combination of resistors directly, or invertedly, to the windings of the synchro transformer.

Another feature of the invention is switching means for connecting the three terminals of the synchro transformer, in any desired order to the testing circuit.

The invention will be better understood from the following description, when read in conjunction with the drawings, in which:

Fig. 3 is a simplified schematic of a typical test set embodying the invention;

A synchro control transformer has the form of a small electric motor having an exciting winding arranged to have rotary motion with respect to three phase windings. The exciting winding may be on the rotor and the phase windings on the stator, or vice versa, so long as the windings may be rotated with respect to each other. The exciting winding is commonly arranged for connection to a single phase source, though a multiphase winding may be used; and the phase windings may be connected in Y or delta. In some cases, the phase windings may be the exciting windings.

Figure 1:
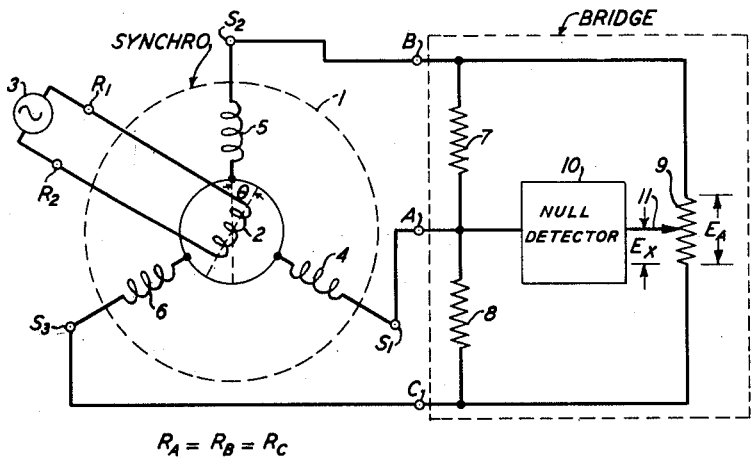
Fig. 1 is a simplified schematic showing of a synchro control transformer and test set.

For convenience of description, and not as any limitation on the scope of the invention, the synchro transformer 1, shown in Fig. 1, has a rotary single phase exciting winding 2, connected by terminals R1, R2, to a suitable source 3, and phase windings 4, 5, 6 connected in Y, and respectively connected to terminals S1, S2, S3, which are respectively connected to terminals A, B, C. To measure the angle of rotation of the exciting winding, two equal resistors 7, 8, are respectively connected between terminals AB and AC; and a potentiometer winding 9, having a resistance equal to the resistance of resistor 7 is connected to terminals BC. A null detector 10, or other suitable meter, is connected from the junction of resistors 7, 8, to a brush 11 contacting the winding 9.

Let $\theta$ be the angle of rotation of the exciting field measured clockwise from the position where equal voltages are induced in the windings 4 and 6; $E_A$ be the voltage drop across the winding 9; and $E_x$ the voltage from terminal C to brush 11, when brush 11 is adjusted to make the null detector 10 read zero. Under these conditions, it may be shown that for values of $\theta$ between 0 and 60 degrees:

$$\frac{E_x}{E_A} = \frac{1}{2}[1 + \sqrt{3} \tan(\theta - 30°)] \qquad (1)$$

Figure 2:
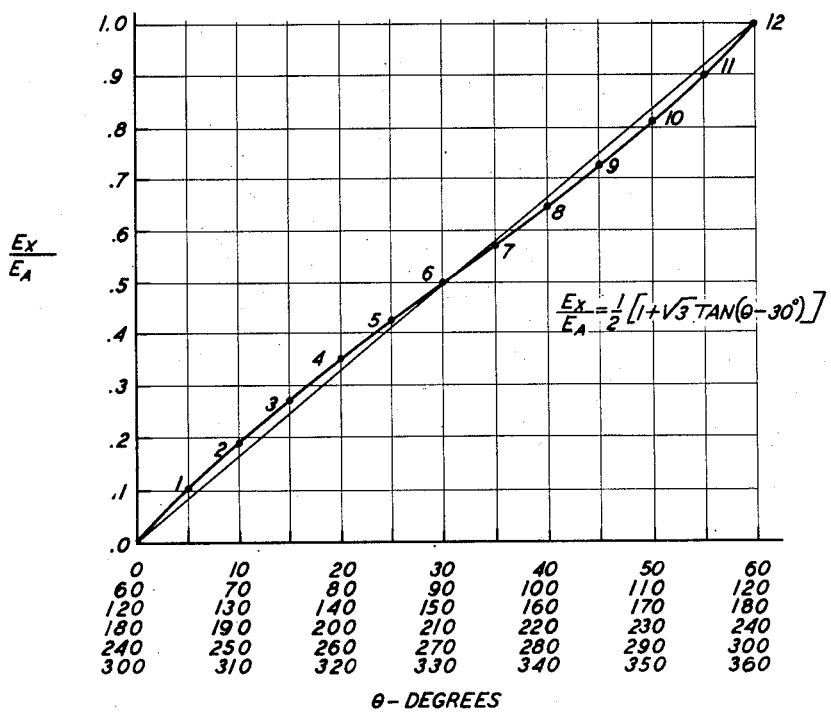
Fig. 2 is a curve of the computed test values plotted against the synchro angle.

The ratio $$\frac{E_x}{E_A}$$

as given in Equation 1, is plotted in Fig. 2, against the angle $\theta$. As this is a potentiometer ratio, the values of this ratio must be between 0 and 1. For values of $\theta$ from 0 to 60 degrees, and also from 180 to 240 degrees, the values of the right side of Equation 1 also lie between 0 and 1, and a solution of Equation 1 is possible. For these values of $\theta$ between 0 to 60 degrees, and 180 to 240 degrees, the voltage S2S3 is of one polarity, and the voltages S1S2, and S3S1 are of opposite polarity. Now, for values of $\theta$ between 60 to 120 degrees, and 240 to 300 degrees, the voltage S3S1 is of one polarity, and the voltages S1S2 and S2S3 are of opposite polarity, thus, owing to the symmetrical arrangement of the windings, if the connections shown in Fig. 1 are changed to connect S1 to C, S2 to A, and S3 to B, Equation 1 may be solved. Similarly, for values of $\theta$ between 120 to 180 degrees, and 300 to 360 degrees, the voltage S1S2 is of one polarity, and the voltages S2S3 and S3S1 are of opposite polarity, thus, if the connections shown in Fig. 1 are changed to connect S1 to B, S2 to C, and S3 to A, Equation 1 may be solved.

Figure 3:
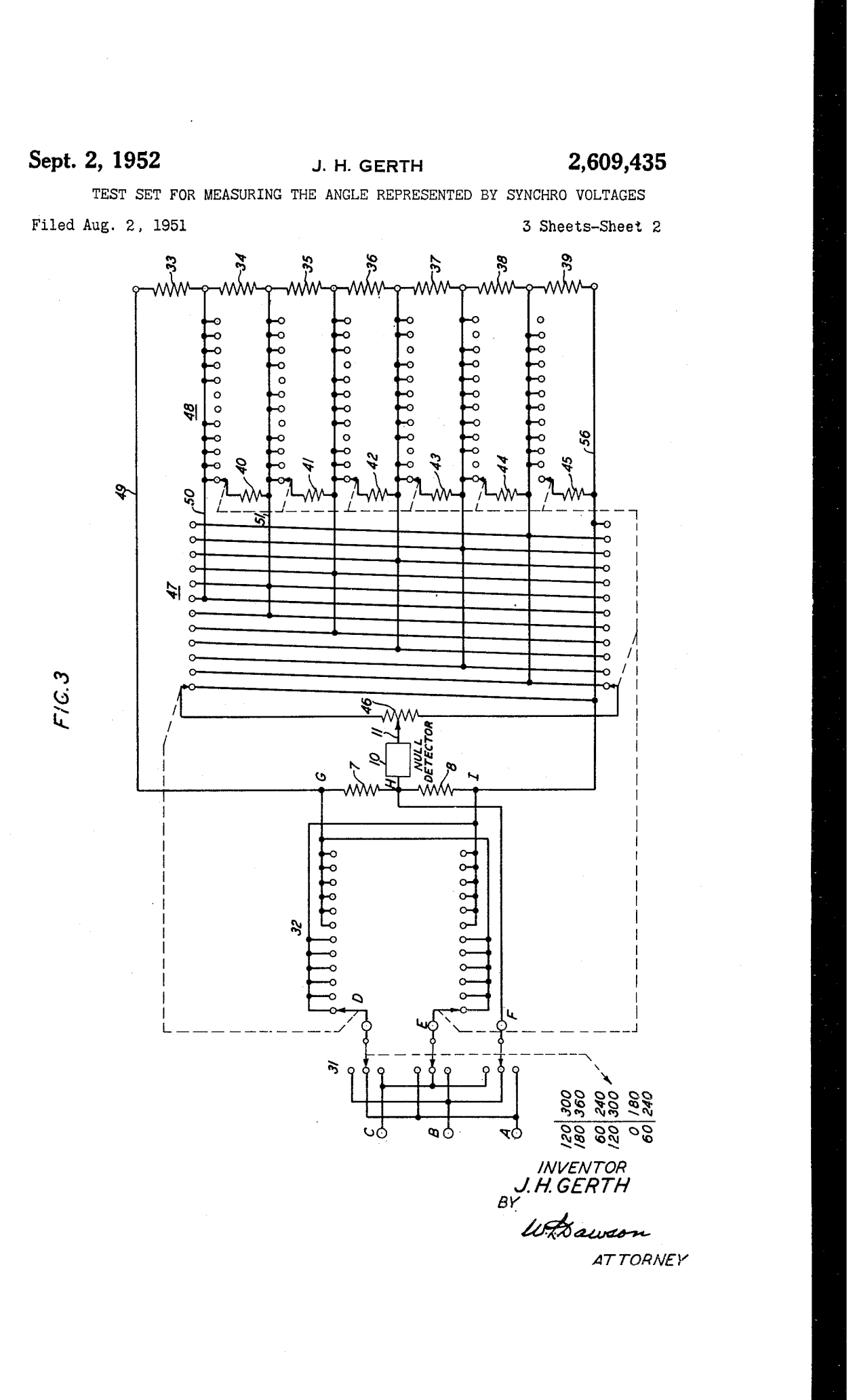

In Fig. 3, the terminals S1, S2, S3, of the synchro transformer being tested are respectively connected to terminals A, B, C. With switch 32 in the first position, moving switch 31 to the lowest position will connect S1 to H, the junction of resistors 7, 8, S2 to G, the terminal of resistor 7, S3 to I, the terminal of resistor 8, as shown in Fig. 1, for angles of 0 to 60 degrees, and from 180 to 240; moving switch 31 to the second position will connect S1 to I, S2 to H, and S3 to G, as shown in Fig. 3, for values of $\theta$ from 60 to 120 degrees, and from 240 to 300 degrees; moving switch 31 to the highest position will connect S1 to G, S2 to I, and S3 to H, for values of $\theta$ from 120 to 180 degrees, and from 300 to 360 degrees.

In Fig. 2, a straight line has been drawn through the extreme values of Equation 1. In some prior testing systems, a bridge circuit similar to Fig. 1 was used; the potentiometer winding 9 varying linearly in resistance. For equal increments of movement of the brush 11, the potentiometer ratios will fall on the straight line in Fig. 2, and, either a complicated formula must be used to convert these potentiometer ratios into the corresponding values of $\theta$; or the potentiometer dial must be calibrated in unequal steps. Again, while the potentiometer wire could be wound on an insulating card so shaped that the potentiometer ratios would have the values required for the solution of Equation 1, for reasonable accuracy, such a shaped potentiometer would be bulky, fragile, and expensive.

In accordance with the present invention, a plurality of resistors connected in serial relationship, or a single tapped resistor, are selected to give accurately the potentiometer ratios indicated by the dots in Fig. 2, and a linear, auxiliary potentiometer is combined therewith to give values intermediate of the values shown by dots.

In Fig. 2, the curve of Equation 1 is symmetrical about the mid-point, thus, in accordance with the present invention, a fixed resistor, having the same resistance as the sum of the resistances of the potentiometer resistors, is connected in serial relationship therewith, and the potentiometer resistors are selected to give the ratios indicated by points 1 to 6. The connections to the combination of resistors are then interchanged, and the potentiometer resistors will then give the ratios indicated by points 7 to 12.

In Fig. 1, to have equal loading on the phase windings, the resistances of 7, 8, 9, preferably are equal; and, to reduce the load on the synchro, for normal conditions, these resistances may be, say, 10,000 ohms. For other types of synchro, other suitable values of these resistances may, of course, be used.

In Fig. 3, terminal G of resistor 7 is connected by connection 49 to resistor 33, and terminal I of resistor 8 is connected by connection 56 to resistors 39, 45. Resistor 33 is connected in serial relationship with the combination of resistors 34 to 39. For steps 1 to 6 of switch 32, terminal D is connected to terminal I and terminal E is connected to terminal G, so that the potentiometer resistors may give ratios indicated by points 1 to 6 of Fig. 2; for steps 7 to 12 of switch 32, terminal D is connected to terminal G and terminal E is connected to terminal I, thus reversing the connections to the bridge circuit so that the potentiometer resistors may give the ratios indicated by points 7 to 12 of Fig. 2.

The values of Equation 1 are, approximately

| Degrees | 0 | 5 | 10 | 15 | 20 | 25 | 30 |
|---|---|---|---|---|---|---|---|
| Values | 0 | .097 | .185 | .268 | .347 | .424 | .500 |

| Degrees |  | 35 | 40 | 45 | 50 | 55 | 60 |
|---|---|---|---|---|---|---|---|
| Values |  | .576 | .653 | .732 | .815 | .903 | 1.000 |

Assume resistor 33 is 5000 ohms, and that resistors 34 to 39, with their associated shunt resistors respectively have resistances of 757, 769, 793, 830, 883, 968 ohms. With the free end of resistor 39 as zero, the potentiometer ratios of the junctions of resistors 39 to 34 will respectively be .097, .185, .268, .347, .424, .500, in agreement with the values of Equation 1 for $\theta$ from 0 to 30 degrees. With the connections reversed, and the free end of resistor 33 as zero, the potentiometer ratios of the junctions of resistors 34 to 39 will be .576, .653, .732, .815, .903, 1.000, in agreement with the values of Equation 1 for $\theta$ from 30 to 60 degrees.

The resistors 7, 8, preferably have equal resistances, of, say 10,000 ohms; the resistor 33 may have half this resistance, and the combination of resistors 34 to 46 may have the same resistance as resistor 33. The upper terminals of resistors 34 to 39 are respectively connected to all but two of the contacts of switch 48. The blades of switch 48 are respectively connected to the free terminals of resistors 40 to 45; the other terminals of these resistors being respectively connected to the lower terminals of resistors 34 to 39. The resistors 40 to 45, and the potentiometer winding 46, have the same resistance, say 10,000 ohms. The resistors 34 to 39 are selected so that, when connected in parallel with a resistor of this value, the respective junctions of resistors 34 to 39 will give the potentiometer ratios shown in Fig. 2.

The junction of resistors 33, 34, is connected by conductor 50 to all contacts but contacts 6, 7, of the upper bank of switch 48, to contact 7 of the upper bank of switch 47 and to contact 6 of the lower bank of switch 47. When switches 47, 48 are on the 6th contact, resistor 40 is disconnected, connection 50 is connected through the 6th contact of the lower bank of switch 47 and the winding 46 to the 6th contact of the upper bank of switch 47, and conductor 51, thus substituting the winding 46 for resistor 40. In the 7th position of switches 47, 48, resistor 40 is also disconnected, connections 50 is connected through the 7th contact of upper bank of switch 47, and the winding 46 to the 7th contact of the lower bank of switch 47 and conductor 51. Thus, in the 6th and 7th positions of switches 47, 48, the winding 46 is substituted for the resistor 40; and in the 7th position the connections of winding 46 are reversed.

Switches 32, 47, 48, are preferably one 12-position, 10-bank switch, in which all the switch blades are moved simultaneously. Due to the reversal of connections to the bridge when switch 32 is moved from the 6th contact to the 7th contact, the connections of winding 46 are similarly reversed when passing from a contact less than 7 to a contact greater than 6.

The second bank of switch 48 substitutes the winding 46 for resistor 41 on the 5th and 8th contacts; the third bank of switch 48 substitutes the winding 46 for resistor 42 on the 4th and 9th contacts; the fourth bank of switch 48 substitutes the winding 46 for resistor 43 on the 3rd and 10th contacts; the fifth bank of switch 48 substitutes the winding 46 for resistor 44 on the 2nd and 11th contacts, and the sixth bank of switch 48 substitutes the winding 46 for resistor 45 on the 1st and 12th contacts.

The first six steps of switches 47, 48 successively substitute the winding 46 for resistors 45 to 40, while switch 32 maintains one set of connections to resistors 7, 8; the second six steps of switches 47, 48 successively subtitute the winding 46 for resistors 40 to 45, while switch 32 reverses the connections to resistors 7, 8. The brush 11, contacting winding 46, is connected through the null detector 10 to the junction H of resistors 7, 8. The successive junction points of resistors 39 to 33, with the corresponding shunt resistors, give the correct potentiometer ratios for each five degrees, as shown on Fig. 2, and the potentiometer 11, 46, linearly interpolates between these values.

Figure 4:
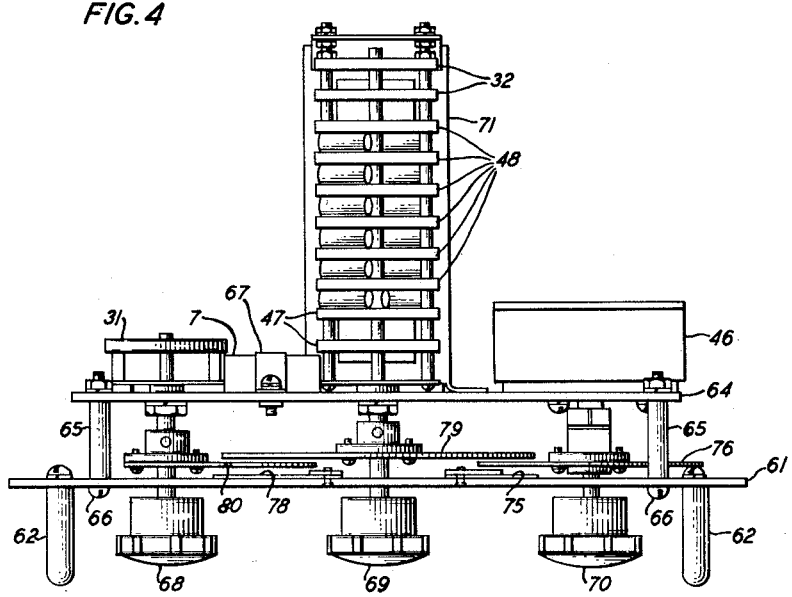
Fig. 4 is a top view of the test set of Fig. 3.
Figure 5:
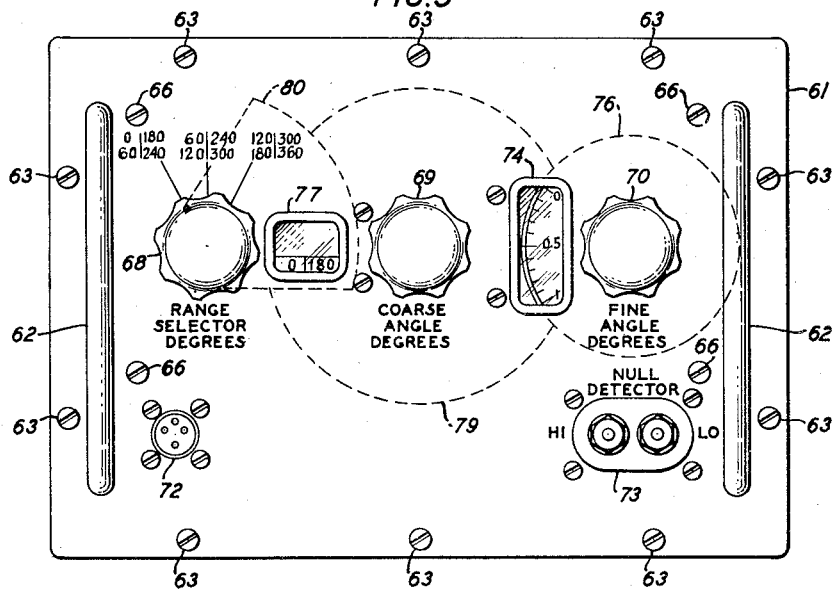
Fig. 5 is a front view of the test set of Fig. 4.

Figs. 4 and 5 show a convenient structure embodying the circuit of Fig. 3, and having a mounting plate 61, equipped with handles 62, 62, for convenience in sliding the test set into an appropriate container (not shown) to which the plate 61 may be secured, as by screws 63, 63. A second mounting plate 64 is supported by plate 61, and spaced therefrom by spacers 65, 65, secured by bolts 66, 66. The range selector switch 31 is mounted on plate 64 with the shaft extending through plate 61 to the operating knob 68. The larger resistors 7, 8, 33, may conveniently be mounted on plate 64, and secured by a suitable clamp 67. The coarse angle switches 32, 47, 48, may be mounted on plate 64, with the shaft extending through plate 61 to the operating knob 69. Resistors 34 to 45 may be mounted between the decks of switch 48, and, as this assembly of switches 32, 47, 48, and resistors 34 to 45 may be comparatively heavy, the assembly may be supported by a sheet metal support 71 secured in any suitable manner to plate 64. Potentiometer 46 may be secured to plate 64 with the shaft extending through plate 61 to the operating knob 70. The cable from the synchro being tested is plugged into jack 72, while the null detector is plugged into jack 73.

A small window 74 is cut through plate 61, and covered by a transparent shield 75 to expose the dial 76, of potentiometer 46. The dial 76 may conveniently be graduated from 0 to 5 degrees in 0.1-degree steps.

A second window 77 is cut through plate 61, and covered by a transparent shield 78 to expose the dial 79 associated with switches 32, 47, 48. In accordance with Fig. 2, the dial 79 has six angles marked for each step, the two central angles being located on the radius of the dial, and the other four angles parallel thereto. The first step is graduated

120|300
60|240
0,180 the second step

125|305
65|245
5|185 and so on for the remaining ten steps.

Figure 6:
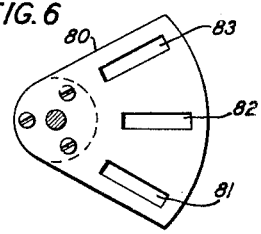
Fig. 6 is a detail view of the movable shutter 80 shown in Fig. 5.

A movable shutter 80 is secured to the shaft of switch 31 and interposed between the dial 79 and the window 77. As shown in Fig. 6, three slots 81, 82, 83 are cut in the shutter 80 in such locations that, when switch 31 is in the first position, slot 81 exposes only the lower one-third of window 77, and the markings on dial 79, 0, 180; 5, 185; etc. When switch 31 is in the second position, slot 82 exposes only the central one-third of window 77, and the markings on dial 79, 60, 240; 65, 245; etc. When switch 31 is in the third position, slot 83 exposes only the upper one-third of window 77, and the markings on dial 79, 120, 300; 125, 305; etc. When the test set has been adjusted to null the detector, the synchro angle is the sum of the readings of dials 79, 76. Two readings will be shown on dial 79, spaced apart by 180 degrees, but this ambiguity may easily be resolved by visual inspection of the synchro being tested.

If the synchro angle is unknown, the test may conveniently be made as follows: with switches 32, 47, 48, in any position, adjust switch 31 till the null detector 10 gives a minimum reading. The dial of switch 31 is graduated to indicate the 60-degree range of the reading. Switches 32, 47, 48 are then adjusted until the detector 10 reads a minimum. The dials of these switches are graduated to indicate the 5-degree range of the reading. If the angle lies near one end of the 60-degree range, it may be necessary to readjust switch 31 and switches 32, 47, 48. The brush 11 is then adjusted till the detector 10 shows an exact null. The dial brush 11 is graduated in degrees, and tenths of degrees. If the angle is some integral multiple of five degrees, it will not be possible to null the detector 10 exactly. With switches 32, 47, 48 set at the correct angle, the detector 10 will approach a null as the brush 11 approaches zero, but will not pass through the null reading. Switches 32, 47, 48, may then be set to the next lower range and brush 11 moved toward the maximum. If the detector 10 again approaches a null, without passing through the null reading, the angle is an integral multiple of five degrees. The synchro angle is the sum of the angles indicated by the dials actuated by the shafts moving the switches 31, 32, 47, 48, and brush 11.

It is to be understood that the above-described arrangements are illustrative of one application of the principles of the invention. Numerous other arrangements may be devised by those skilled in the art without departing from the spirit and scope of the invention.

What is claimed is:

1. Apparatus for determining the angle of rotation of a synchro transformer having an exciting winding capable of relative rotary motion with respect to three phase windings respectively connected to phase terminals comprising: two equal resistors connected in serial relationship, a null detector connected to the junction of said resistors, a potentiometer having resistor means equal in resistance to the resistance of either of said resistors connectable in parallel relationship with said resistors and a brush contacting said resistor means and connected to said detector, and a three-pole, three-position switch, having blades respectively connected to the free ends and the junction of said resistors, and contacts connected to said phase terminals so arranged that the operation of said switch will connect each phase terminal in succession to the junction of said resistors and the other two terminals to the free ends of said resistors.

2. The combination in claim 1 in which said resistor means includes a fixed resistor connected in serial relationship with a potentiometer winding, and switching means for reversing the connections of said resistor means to said equal resistors.

3. A test set for measuring the electrical angle between one winding of a synchronous device excited by a single phase source and another winding having three phase tappings respectively connected to phase terminals, said windings being supported for relative rotary motion, comprising first and second equal resistors connected in serial relationship, a first three-pole three-position switch having the contacts of each position respectively connected to said terminals, one blade of said switch being connected to the junction of said resistors, a two-pole, multiposition switch having two blades respectively connected to the other two blades of said first switch, and contacts connected in multiple to form two equal groups per pole, the first groups of the two poles being respectively connected to the free ends of said first and second resistors and the second groups of the two poles being respectively connected to the free ends of the second and the first resistor, whereby the three terminals of the phase windings may be connected in all possible arrangements to said free ends and the junction of said resistors, a third resistor, and a stepped potentiometer connected in serial relationship across the free ends of said first and second resistors, said stepped potentiometer comprising a plurality of resistors connected in serial relationship, each resistor being connectable in parallel relationship with a shunt resistor, said potentiometer resistors being so proportioned with said shunt resistors that the junction of each two potentiometer resistors has a potentiometer ratio corresponding to a different angle of said device, a linear potentiometer having a winding equal in resistance to each of said shunt resistors and a brush, a null detector connected from said brush to the junction of said first and second resistors, and a multipole, multiposition switch having the same number of positions as said two-pole, multiposition switch, connected to said shunt resistors and the winding of said linear potentiometer, whereby the winding of said linear potentiometer may be successively substituted for said shunt resistors and the brush of said linear potentiometer may be adjusted to select potentiometer ratios intermediate the ratios represented by the junctions of said potentiometer resistors.

4. The combination in claim 3 with a dial rotated by said two-pole, multiposition switch and having three sets of graduations respectively differing by 60 degrees, the graduations in each set differing by 180 degrees, and a shutter actuated by said three-position switch to expose only one set of said graduations for each position of said switch.

JOHN H. GERTH.

No references cited.